United States Patent [19]

DePalma et al.

[11] Patent Number: 4,533,582

[45] Date of Patent: Aug. 6, 1985

[54] STABILIZED MAGNETIC RECORDING MATERIALS AND PROCESS FOR TAILORING AND STABILIZING OF MAGNETIC RECORDING MATERIALS

[75] Inventors: Vincent M. DePalma, Pleasant Valley, N.Y.; Albert W. Ward, Santa Cruz, Calif.

[73] Assignee: International Business Machines Corporation, Armonk, N.Y.

[21] Appl. No.: 515,327

[22] Filed: Jul. 19, 1983

Related U.S. Application Data

[63] Continuation-in-part of Ser. No. 380,658, May 21, 1982, abandoned, which is a continuation-in-part of Ser. No. 219,620, Dec. 24, 1980, abandoned.

[51] Int. Cl.$^3$ .............................................. H01F 10/02
[52] U.S. Cl. .................................... 428/64; 427/128; 427/130; 427/131; 427/380; 428/413; 428/425.9; 428/457; 428/693; 428/694; 428/900
[58] Field of Search ............... 427/128, 130, 131, 380; 428/64, 413, 425.9, 457, 693, 694, 900

Primary Examiner—Bernard D. Pianalto
Attorney, Agent, or Firm—Walter J. Madden, Jr.

[57] ABSTRACT

A storage stable, pre-selected magnetic coercivity is imparted to a recording disk having a film of heat curable magnetic coating composition thereon by curing the composition in an anaerobic atmosphere at a high temperature, and then heating, typically in air, at a lower temperature for a period of time effective to raise the coercivity to the pre-selected higher value.

14 Claims, 10 Drawing Figures $H_c$ vs CURE TEMP.

ANNEAL TIME OF $N_2$ CURED DISKS $H_c$ vs ANNEAL TIME OF $N_2$ CURED DISKS $N_2$ CURE

Co-$\gamma$ Fe$_2$O$_3$ (EX 2566)
$H_c$ vs $N_2$ CURE TEMP.

Co-$\gamma$-Fe$_2$O$_3$ (PFIZER 2560)
IN POLYURETHANE

STABILIZED MAGNETIC RECORDING MATERIALS AND PROCESS FOR TAILORING AND STABILIZING OF MAGNETIC RECORDING MATERIALS

CROSS-REFERENCE TO RELATED APPLICATION

This application is a continuation-in-part of application Ser. No. 380,658, filed May 21, 1982, which is a continuation-in-part of application Ser. No. 219,620, filed Dec. 24, 1980, both now abandoned. The disclosure of both of these prior applications is incorporated herein by reference.

TECHNICAL FIELD

This invention relates to processes for producing magnetic recording materials, more specifically to processes for controllably tailoring, enhancing and stabilizing the magnetic recording properties of such materials, and to the magnetic recording materials thus produced.

BACKGROUND ART

In the preparation of magnetic recording materials, such as for use in magnetic recording disks, it is common practice to use magnetic particles such as $\gamma$-$Fe_2O_3$, dispersed in a binder mixture such as an epoxy/phenolic resin. This mixture of magnetic particles and binder is typically applied to a disk substrate as a liquid/solid dispersion, such as by spin coating, and the resultant coating is then cured in air to convert the liquid coating to a firm magnetic layer. However, when these types of magnetic compositions are cured in air, a coercivity lower than desired is often produced.

It is believed to be that when air curing a magnetic composition as discussed above, there is added anisotropy due to the chemical reduction of to $Fe^{3+}$ to $Fe^{2+}$ at the surface of the particles. It is well known that at elevated temperatures $Fe^{3+}$ ions will react with many functional groups (e.g., alcohols, phenols). The organics become oxidized while the $Fe^{3+}$ ion is reduced to $Fe^{2+}$. The $Fe^{2+}$ ion is then reoxidized to $Fe^{3+}$ by oxygen (or oxygen-related species) trapped at the surface of the particles. The oxygen is then replaced by oxygen from the surrounding atmosphere. Catalysis literature commonly discusses this cycle for transition metal ions. This is similar to the more widely known oxygen uptake by chromic acid solutions. Essentially, the $\gamma$-$Fe_2O_3$ is an oxidation catalyst for the epoxy-phenolic system in the normal air-cure.

PRIOR ART

The assignee of the present application published a general discussion of the modification of magnetic properties of disk coatings by nitrogen curing in IBM Technical Disclosure Bulletin, Vol. 22, 8B, January 1980, page 3799. This article, the disclosure of which is incorporated herein by reference, teaches improving the magnetic properties of magnetic coating compositions containing cross-linking polymers and pigments by curing the coating in an anaerobic environment. More particularly, this article discusses that coatings containing $\gamma$-$Fe_2O_3$ cured in an $N_2$ atmosphere over a temperature range of 400°–525° F. showed greater durability and improved magnetic properties. Although the coercivity of anaerobically cured magnetic coating compositions can be increased substantially above the maximum value achievable when the same composition is cured in air, we have found that the coercivity further increases upon storage as a function of time. This creates problems with respect to the commercial use of such magnetic recording materials inasmuch as the increased coercivity as a result of time, when it is desired to use such a recording material, may not be suitable for the intended purpose for which it was originally designed.

The article "Magnetic and Optical Properties of Thin Films in the System 1-x $Fe_3O_4$.x$Fe_{8/3}O_4$" by Borelli et al. in IEEE Transactions on Magnetics Sept. 1972, page 648; discusses the importance of enhancing coercivity of thin magnetic films for purposes of high-density recording. This article discusses treating the film in an oxidating environment However, as discussed therein, these films (1) are of thin metal composition and therefore not susceptible to the same polymer/particles chemical interaction, and (2) the coercivity also begins to change as a function of time after treatment.

U.S. Pat. No. 4,015,030, Sasazawa et al. discloses subjecting a cured magnetic recording member to an aging treatment at 40°–80° C. to stabilize certain magnetic properties thereof. However, Sasazawa et al. also discloses that after the aging treatment, coercivity $H_c$ continued to increase over a period of several days, thus providing an unstable coercivity.

OBJECTS OF THE INVENTION

We have found that the magnetic coercivity of an anaerobically cured magnetic coating composition can be further increased by a simple low temperature annealing step, and in addition, the resultant increased coercivity is storage stable. Moreover, by appropriate selection of annealing temperatures and times, a variety of pre-selected higher coercivities, each of which is storage stable, can be produced.

It is thus an object of the present invention to provide a method of treating a magnetic recording coating composition to both increase and stabilize its magnetic coercivity.

It is another object of the present invention to provide such a method whereby a variety of storage stable enhanced coercivities can be imparted to the same magnetic coating composition.

It is a further object to provide recording disks bearing such improved magnetic coating compositions.

Still another object of the invention is to provide a storage stable magnetic recording composition.

Other objects of the invention will be apparent to those skilled in the art to which the invention pertains.

SUMMARY OF THE INVENTION

In a process aspect, this invention relates to a method of imparting a storage stable pre-selected magnetic coercivity value to a film of a magnetic coating composition on a substrate and a heat curable binder system having magnetic particles therein, comprising the steps of:

curing said coating composition in an anaerobic atmosphere by heating said film at a temperature and for a period of time effective to cure the binder system and raise the magnetic coercivity of said coating composition to a first, storage unstable value lower than said preselected value, but substantially higher than the value achievable when said coating composition is cured in air;

annealing said cured composition by heating said cured coating composition in an environment at a temperature substantially lower than said curing temperature, but higher than standard room temperature, for a period of time effective to further increase the coercivity of said coating composition to the pre-selected value; and cooling said coating composition, thereby rendering its magnetic coercivity storage stable at said preselected value.

In an article of manufacture aspect, this invention relates to recording disks, and like magnetic recording disks the coercivity of whose magnetic coating composition is enhanced and rendered storage stable acccording to the method of this invention.

By specifically tailoring the annealing conditions, both time and temperature, with respect to the curing conditions, the invention provides enhanced coercivities suitable for high-density recording, and the resultant coercivity is storage stable over long periods of time.

In a more specific aspect, the curing step is conducted at a temperature of 175°–290° C., for at least about one hour, typically for about two hours with the annealing being conducted at a tempreature of at least 60° C., and typically no more than 120° C. Above 120° C., there is little technical or practical reason for the annealing step since there is only a minimal increase in $H_c$ above that temperature and in an aerobic environment, oxidation of the magnetic material becomes evident and competes with coercivity increasing mechanisms.

Furthermore, if instead of conducting a separate annealing step at a lower temperature the curing step is merely conducted for a longer period of time, the coercivity begins to drop, i.e., magnetic properties deteriorate, and the binder composition also physically deteriorates, i.e., physically cracks. Thus, it is clear that a different phenomenon occurs as a result of annealing, as compared to the cure, especially when annealing is conducted within the range of 60°–120° C. Below 60° C., it has been found that a stable coercivity cannot be achieved within a reasonably short time, i.e., within 300 hours or less.

With respect to the anaerobic atmosphere employed in curing, any inert gas, e.g., nitrogen or helium, preferably one having an oxygen content of less than 30 parts per million can be employed.

In another aspect, the nitrogen cure of the composition is reversible by subsequently curing the disk in conventional air curing. In this regard, it is possible to first increase the magnetic coercivity and enhance the surface properties of the coating composition by curing initially, in an anaerobic atmosphere, followed by curing for a smaller amount of time in an air atmosphere to reduce the coercivity back to its original value.

The invention discussed above resides in the discovery that the physical and magnetic properties, particularly the magnetic coercivity, of a magnetic coating of the type discussed can be controllably varied or tailored by curing, at high temperatures, the coating in an anaerobic atmosphere, followed by an annealing step, i.e., a lower temperature heating step in a conventional aerobic environment, preferably ambient air, at a temperature of up to about 120° C., preferably 60°–90° C. By varying the temperature and the time of such curing in a nitrogen atmosphere, followed by precise control of the annealing conditions, controllable variations in the coercivity can be produced.

The annealing which follows the curing not only is conducted at a substantially lower temperature than the curing temperature, it is conducted for a considerably longer period of time, e.g., up to 300 hours or longer, preferably from 10 to 300 hours and most preferably from 100 to 300 hours. By selecting the appropriate annealing time and temperature, storage stable coercivity values over a wide range can be imparted to the same magnetic coating composition.

More particularly, whereas the prior art conventional nitrogen cure provided a higher coercivity than with the air cure, the resultant media was not storage stable and would increase in coercivity over a long period of time, e.g., 3 years, until it reached an endpoint higher coercivity than that achieved immediately at the end of its cure. It is now possible to arrive at a higher coercivity, selectively tailored to a preselected value, which is stable by heat treating or annealing at a lower temperature than the cure temperature and for a longer period of time than the cure time. Thus, whereas it previously required typically three years to arrive at a stable high coercivity, it is now possible to arrive at a stable high coercivity in a relatively short time, and moreover, at a coercivity which has been individually tailored to a preselected value. Moreover, by using the increase in coercivity and stability resulting from the cure and annealing, the nitrogen cure can be made reversible by subsequently curing the disk in conventional air curing to arrive at an enhanced coercivity lower than the maximum possible, but higher than with the prior art air cure, and with the composition being stable over long periods of time.

A possible mechanism to explain the increased coercivity from the anaerobic cure is the added anisotropy due to the chemical reduction of $Fe^{3+}$ to $Fe^{2+}$ at the surface of the particles. It is well known, as discussed previously, that at elevated temperatures, $Fe^{3+}$ ions will react with many functional groups (e.g., alcohols, phenols). The organics become oxidized while the $Fe^{3+}$ is reduced to $Fe^{2+}$. The $Fe^{2+}$ is reoxidized to $Fe^{3+}$ by oxygen (or oxygen related species) trapped at the surface of the particle. The oxygen is then replaced by oxygen from the surrounding atmosphere in the normal air cure. The elimination of oxygen in the air prohibits the $Fe^{2+} \rightarrow Fe^{3+}$ oxidation, and as a result, a concentration of $Fe^{2+}$ is formed at the surface resulting in increased coercivity.

The actual mechanism is probably more complicated than this since in fact the disk cure temperatures are quite low for actual ion migration in the particle necessary to fill the vacancies in the $\gamma\text{-}Fe_2O_3$ structure. Nonetheless, electron migration resulting in $Fe^{2+} \leftarrow Fe^{3+}$ is possible in this semiconductor material.

From a magnetic viewpoint, there are anisotropies developed in the oxide particles due to the production of $Fe^{2+}$ at the surface of the particles. This could be somewhat analogous to the surface absorption of $Co^{3+}$. One source of anisotropy is the distribution of $Fe^{2+} \leftarrow Fe^{3+}$ and vacancies in the unit cell. The other source is the changing nature of the unit cell with depth into the oxide particles. These are obviously not single crystals, but a complicated mixture of $O^{2-}$, $Fe^{3+}$ and $Fe^{2+}$ ions and vacancies, which at the interior of the particle is probably pure $\gamma\text{-}Fe_2O_3$ and at the surface may be a mixture of $Fe_3O_4$ and $\gamma\text{-}Fe_2O_3$.

By using Mossbauer Spectroscopy on nitrogen cured disks, it has been suggested that in the normal two hour nitrogen cure, less than 5% of the $\gamma\text{-}Fe_2O_3$ is converted to $Fe_3Ohd$ 4. The Mossbauer spectra of $Fe_2O_3$ in the disk coating and the products after a 12-hour cure indicate the presence of $Fe_3O_4$ in the cure products.

In such a cured high coercivity material, later annealing at low temperature further increases coercivity. Depending on annealing temperature, a very high coercivity can be achieved. However, if temperature is too high, e.g., above 95° C., the coercivity quickly goes through a maximum, the value and time to reach it being dependent on annealing temperature, and then the oxide reverts to its original state.

Thus, preparing stable compositions of a given coercivity is basically a process of following a high temperature kinetic curve for a predetermined period of time, lowering the temperature, and then following another kinetic curve. The annealing process is sensitive to variations in cure conditions and thus must be tailored to the particular curve conditions selected.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
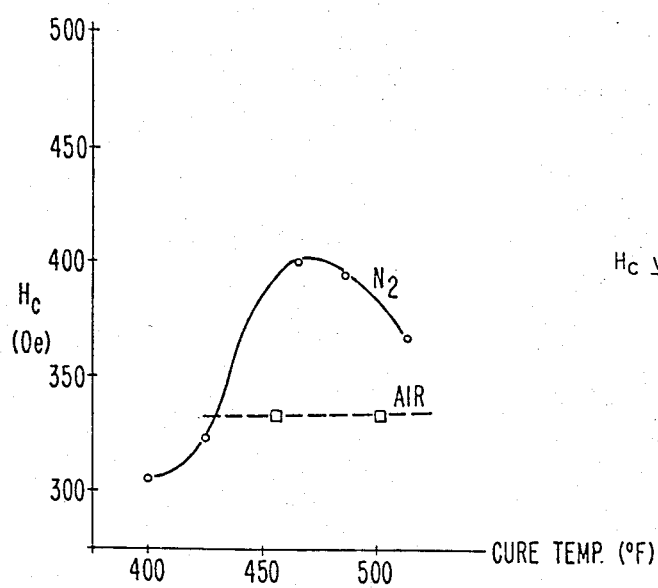
FIG. 1 is a graph showing the coercivity versus cure temperature for magnetic disks cured in air as compared to nitrogen-cured disks at different temperatures.

FIG. 1 illustrates the modification of coercivity ($H_c$) produced in a magnetic coating by curing in an anaerobic atmosphere, e.g., nitrogen, for different cure temperatures, as compared to a conventional air cure. The magnetic coating composition tested and illustrated in FIG. 1 comprises an epoxy/phenolic resin having magnetic $\gamma$-$Fe_2O_3$ particles dispersed therein. These compositions were on disks which were cured for two hours in a nitrogen environment at the temperatures illustrated. As can be seen clearly from the graph, the nitrogen-cured coating shows a significant increase in coercivity at temperatures above about 425° F., i.e., about 220° C., with the coercivity increase peaking at about 450° F., i.e., about 232° C., and then beginning to decrease at temperatures above that.

As contrasted to air-cured magnetic disks, the coercivity of the nitrogen cured disks is significantly higher. Moreover, the increase in coercivity of the nitrogen cured disks is a reversible process, and all that is needed to return the disk to the original coercivity is to reheat the disk in an atmosphere containing oxygen.

Disks cured in nitrogen exhibit a color change, from normal $\gamma$-$Fe_2O_3$ brown to black. The cause of the disk color change is that the oxide is partially reduced. Both ESCA and infrared spectra indicate the presence of $Fe^{2+}$ ions on the disk surface following a nitrogen cure. However, Mössbauer spectral investigations, with a sensitivity of approximately 5%, could not detect the presence of $Fe^{2+}$ until a disk sample had been cured for approximately 12 hours.

Figure 2:
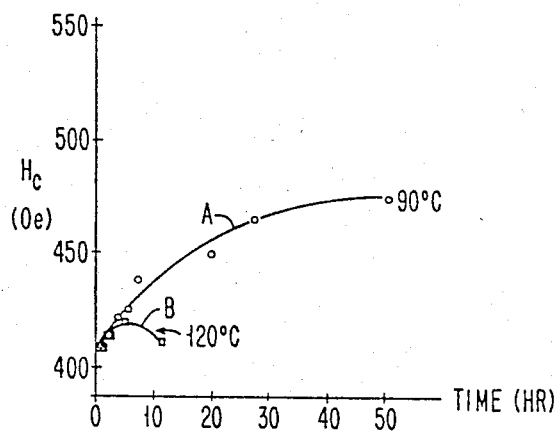
FIG. 2 is a graph illustrating the effect on coercivity of different lengths of annealing time on nitrogen-cured disks, and comparing the effects of annealing these disks at 90° C. versus 120° C.

Subsequently, the disks are annealed, and as illustrated in FIG. 2, coercivity is further enhanced, depending on the annealing temperature and time. FIG. 2 illustrates the effect on coercivity of different annealing time periods on nitrogen-cured disks. Curve A represents annealing at 90° C. for different periods of time of up to 50 hours on disks which had been cured for 2 hours at 200° C. (500° F.). It is seen that the annealing process produces a further increase in coercivity of the nitrogen-cured disks, and that annealing for 50 hours produces the maximum coercivity enhancement.

Curve B of FIG. 2 shows the annealing of the same type of disk as in curve A, but conducted at 120° C. and indicates for this particular nitrogen-cured disk, that such annealing produces only a slight increase in coercivity and that the coercivity drops as a function of a relatively short period of time. It is noted that in all these cases annealing is conducted in an environment containing air, i.e., oxygen, and the environment for conducting the curing being an inert atmosphere such as nitrogen with less than 30 parts per million of oxygen.

Figure 3:
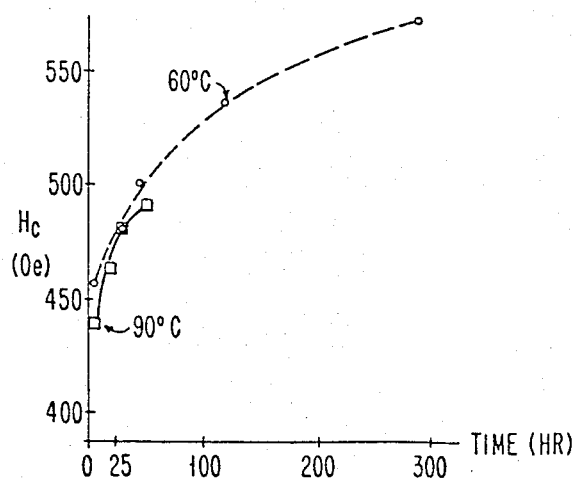
FIG. 3 is a graph similar to FIG. 2 comparing annealing at lower temperatures than in FIG. 2.

FIG. 3 also illustrates the effects of coercivity on the same type of nitrogen-cured disks as discussed above, but when annealed at 60° C. for longer periods of time than that shown in FIG. 2. It can be seen that the 60° C. annealing produces even greater increases in coercivity over a longer annealing period than that produced at 90° C. (The 90° C. curve from FIG. 2 is also shown in FIG. 3 for comparison.)

As in the case of the 120° C. anneal upon reaching a maximum value, a decrease in $H_c$ begins. Since activation energies for these processes are quite different, a low temperature anneal (e.g., 60° C.) exhibits a slow decrease in $H_c$ with time (See FIG. 7).

The graphs shown in FIGS. 2 and 3 suggest that there are at least two competing processes. The crossover of the coercivity $H_c$ versus time curves while $H_c$ is still increasing suggests that the mechanisms which cause a decrease in $H_c$ is accelerated more with increased temperature than the mechanism which causes $H_c$ to increase. More particularly, the $H_c$ of the media goes through a maximum, with the value and the time to reach it being dependent on the annealing temperature. With extreme conditions, the oxide will revert to its original state. Moreover, by tailoring both the curing and annealing steps, it is possible to make a magnetic recording composition with a preselected, stable coercivity. More particularly, as previously discussed, preparing the composition of a given coercivity is essentially a process of following a high-temperature kinetic curve for a period of time, reducing the temperature, and entering and then following another kinetic curve. (See High Coercivity Particulate Magnetic Media Via In Situ Partial Reduction of $\beta$-Fe$_2$O$_3$ and Modified $\gamma$-Fe$_2$O$_3$ by DePalma et al., IEEE Transactions on Magnetics, Volume Mag.-18, No. 6, November 1982, whose disclosure is incorporated herein by reference.)

Figure 4:
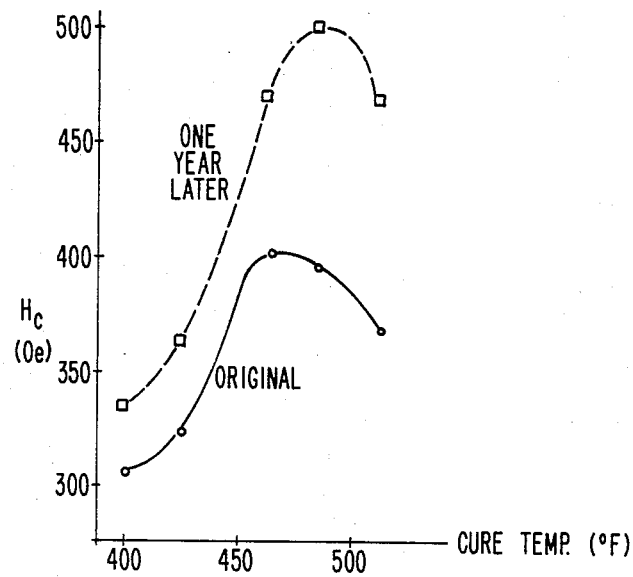
FIG. 4 illustrates the effect of time on the coercivity of disks cured in nitrogen at different temperatures.

FIG. 4 illustrates the increase in coercivity as a function of time or aging for nitrogen-cured disks. The lower solid curve represents measurements made shortly after curing on disks cured at different temperatures in nitrogen, and the upper dotted curve represents coercivity measurements made on these same disks one year later. It can be seen that in nitrogen cured disks, without annealing, the aged disks increase or vary in coercivity over a period of time.

In addition to affecting the magnetic properties of the coating, the nitrogen curing and annealing of the invention affects also the physical properties as well. More specifically, in air curing, both condensation and oxidative cross-linking occur, while in nitrogen curing only condensation cross-linking occurs. The resulting nitrogen-cured coating has a hard, tough film as compared to air-cured coatings which tend to have hard brittle films. Thus, in a more specific aspect, by combining nitrogen-curing followed by some degree of air-curing and then annealing, the physical and magnetic properties of the coating can be optimized for each application.

Not only are the effects on coercivity and physical properties enhanced by practicing the invention with magnetic coatings containing $\gamma$-Fe$_2$O$_3$, the present invention is also useful with coatings containing cobalt-adsorbed $\gamma$-Fe$_2$O$_3$. More particularly, the invention will function effectively with disk samples of cobalt adsorbed-$\gamma$-fe$_2$O$_3$ in epoxy/phenolic formulation as well as cobalt adsorbed-$\gamma$-Fe$_2$O$_3$ in polyurethane.

Figure 5:
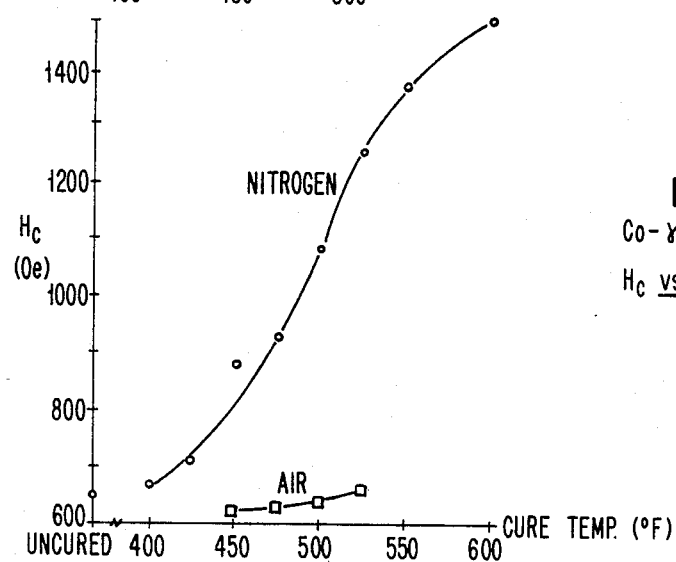
FIGS. 5 and 6 are plots of coercivity versus cure temperatures at two hours for cobalt-adsorbed-$\gamma$-$Fe_2O_3$ systems, for both air and nitrogen cures.
Figure 6:
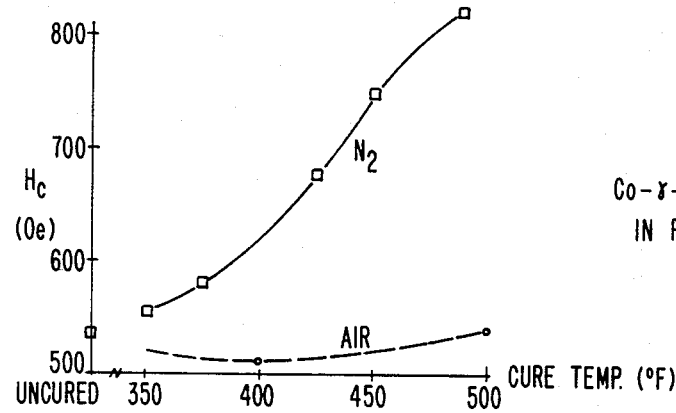

FIGS. 5 and 6 illustrate the effect of nitrogen curing on the above-discussed compositions as compared to the same compositions cured in air. In both cases, the cobalt-adsorbed magnetic materials contain approximately 3% cobalt.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A magnetic coating was prepared comprising a conventional epoxy-phenolic resin having magnetic $\gamma$-Fe$_2$O$_3$ particles dispersed therein. The liquid coating dispersion was applied by spin coating to an AlMg disk as substrate and the coated disks were then placed in an oven to which nitrogen was supplied. A number of disks were cured for 2 hours in a nitrogen environment at the temperatures indicated in FIG. 1, the results for each cure temperature are shown therein.

EXAMPLE 2

The disks of Example 1 were annealed at 90° C. and at 120° C., respectively, for periods up to 50 hours. These disks had been nitrogen-cured initially for 2 hours at 260° C. (500° F.). The results of coercivity increase with annealing at 90° and at 120° C. are shown in FIG. 2.

EXAMPLE 3

The disks of Example 1 were treated, i.e., annealed in air, at temperatures of 60° and 90° for up to 300 hours. The results of annealing at the lower temperature shows an even greater increase in coercivity with eventual stabilizing at a later time. The results are shown in FIG. 3.

EXAMPLE 4

A pigment-binder dispersion was coated on 75 mil aluminum magnesium substrate which was then sheared into $\frac{1}{2}$ inch square coupons. These coupons were then cured in a large oven equipped with gas selection capability. All samples were cured for 2 hours. The magnetic properties were measured using a vibrating sample magnetometer. (VSM). Maximum applied field used in the VSM was in excess of $3 \times H_c$ for all samples.

FIG. 5 illustrates a resultant plot of $H_c$ versus cure temperature (2 hours). Large increases in $H_c$ are observed in nitrogen cure. Though not shown, $H_c$ is further increased and stabilized by annealing. For example, a sample cured at 240° C. (2 hours) was annealed at 60° C. and reached a maximum $H_c$ of 1700 O$_e$. In air, there is a slight decrease in $H_c$ with little or no loss in remanent $M_R$ or saturation magnetization $M_S$. However, in nitrogen, there is a large increase in $H_c$ with no loss, i.e., an actual increase, in $M_R$ or $M_S$.

EXAMPLE 5

A test as in the previous example was conducted for cobalt-adsorbed-$\gamma$-Fe$_2$O$_3$ (Pfizer 2560) in a polyurethane formulation. The results are illustrated in FIG. 6 and are similar to those for the previous example.

EXAMPLE 6

Figure 7:
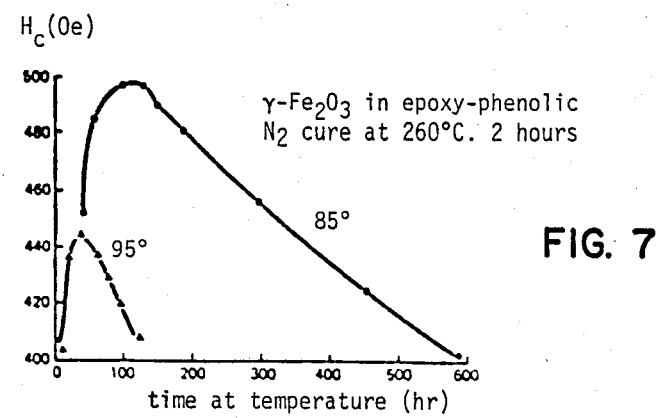
FIG. 7 is a graph illustrating coercivity as affected by anneal time for nitrogen-cured $\gamma$-$Fe_2O_3$.

$\gamma$-Fe$_2$O$_3$ in epoxy-phenolic resin was cured in N$_2$ at 260° C. for 2 hours. Subsequently, samples were annealed over different times. FIG. 7 shows the results of 95° C. annealing and of 85° C. annealing.

A simplified model for this process involves the use of three species A, B and C. A denotes the nitrogen cured modified material, B represents the high coercivity material, and C represents the starting material (e.g., $\gamma$-Fe$_2$O$_3$). Sequential first order reactions are modeled

$$A \xrightarrow{k_1} B \xrightarrow{k_2} C$$

Using data in FIGS. 2, 3 and 7, values for the reaction rates ($k_1$, $k_2$) at a given temperature can be calculated. Using experimentally determined values for $k_1$ and $k_2$ at different temperatures, one can calculate values for $k_1$ and $k_2$ at other temperatures. Using conventional kinetic theory, the $H_c$ of the material can be calculated as a function of its thermal history by the equation $$B = \frac{A_o k_1}{k_2 - k_1} (e^{-k_1 t} - e^{-k_2 t})$$

wherein $A_o$ is the initial concentration of species A.

Figure 8:
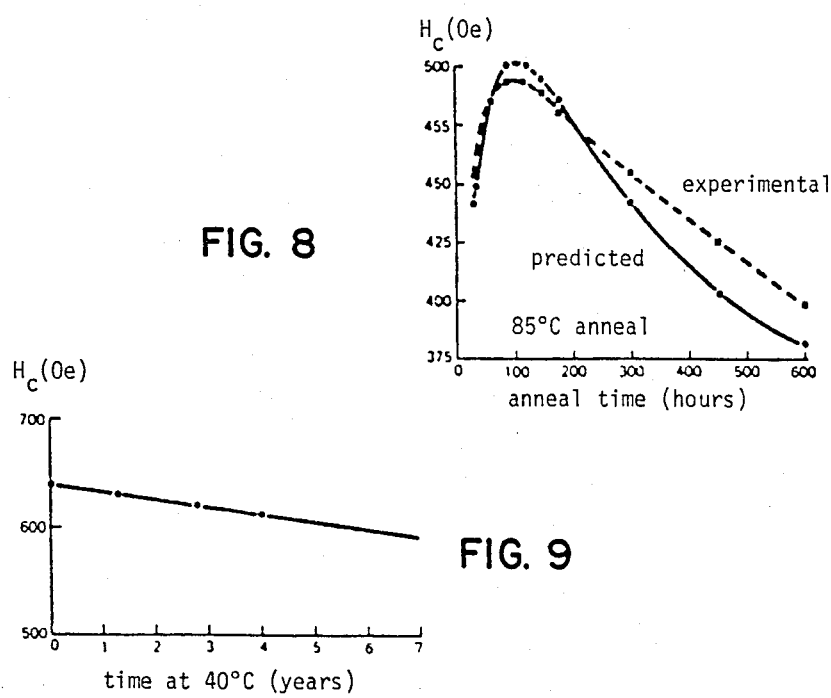
FIG. 8 is a graph comparing experimental to predicted results for a 85° C. anneal for different time period.

The results of experiments annealing disks over different time periods at 85° C. correspond well to predicted results determined. The actual results of 85° C.

annealing are shown in FIG. 8 as compared to predicted values for different periods of time.

Figure 9:
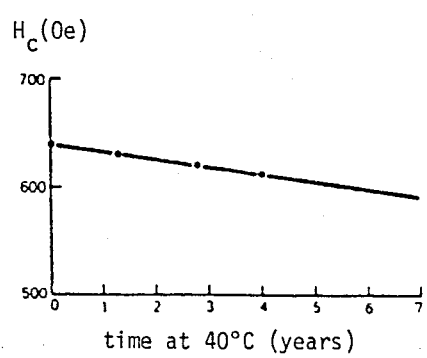
FIG. 9 is a graph illustrating predicted magnetic stability of mixed oxides prepared according to this process.

FIG. 9 shows predicted magnetic stability of mixed oxides with the process of the invention using the above-explained reaction scheme. This scheme is confirmed in the following example.

EXAMPLE 7

Figure 10:
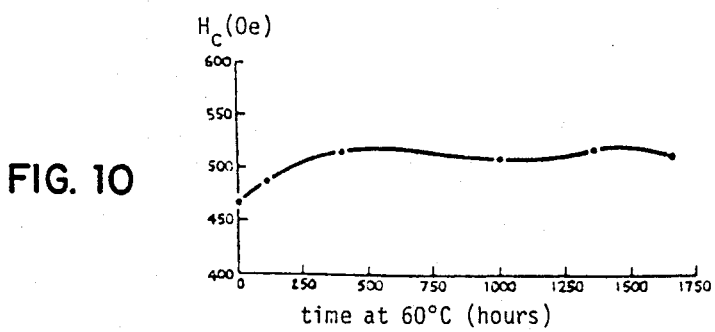
FIG. 10 is a graph illustrating stability of a composition of intermediate coercivity prepared according to the invention.

$\gamma$-Fe$_2$O$_3$ in epoxy phenolic resin was cured on a disk in N$_2$ at 260° C. for two hours. It was then annealed in air at 90° C. for 120 hours. As shown in FIG. 10, this disk was put under stress conditions of operation and the result was a composition of stable H$_c$ at 60° C. The H$_c$ achieved was about 515 O$_e$ after initially about 300 hours of annealing.

The preceding examples can be repeated with similar success by substituting the generically or specifically described reactants and/or operating conditions of this invention for those used in the preceding examples.

The process of the invention has application in many areas in magnetic recording wherein high and stable coercivity is required. More particularly, it has applicability in increasing the coercivity of magnetic recording disks above the coercivity attainable with air cured disks and includes the buried servo field environment in which a magnetic recording disk includes two recording layers. The first layer is of a relatively high coercivity containing servo information for a track following servo system, with the second layer containing data which is written on and read from the disk. In this environment, it is important that writing of data on the upper layer not erase the servo information on the lower layer, and thus, the lower layer must be of considerably higher coercivity than the upper layer. Thus, the present invention can be employed to provide a first layer of significantly enhanced coercivity, preferably in this case with the cobalt-adsorbed magnetic particles of Examples 5 and 6 because of their relatively high coercivity for the storing of servo information, and a second magnetic layer of lower coercivity which is then cured and annealed by the present process to provide the desired structure.

In another aspect, the invention can be used to improve disk coating properties and simultaneously increase the coercivity by the curing in nitrogen and then returning the coercivity to its original value by curing the disk in air followed by annealing. Moreover, the invention is not limited to the epoxy/phenolic and polyurethane binder systems, and other binder systems conventionally employed to produce magnetic recording disks may be used as well.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of imparting a storage stable preselected magnetic coercivity value to a film of a magnetic coating composition on a substrate and including a heat curable binder system having magnetic particles therein, comprising the steps of:

curing said coating composition in an anaerobic atmosphere by heating said film at a temperature and for a period of time effective to cure the binder system and raise the magnetic coercivity of said coating composition to a first, storage unstable value lower than said preselected value but substantially higher than the value achievable when said coating composition is cured in air;

annealing said cured composition by heating said cured coating composition at a temperature substantially lower than said curing temperature, but higher than standard room temperature, for a period of time effective to further increase the coercivity of said coating composition to the selected value; and cooling said coating composition thereby rendering its magnetic coercivity storage stable at said preselected value.

2. A method as in claim 1 wherein said curing step is conducted at a temperature of about 175° C.-290° C. for at least 1 hour.

3. A method as in claim 1, wherein said annealing step is conducted at a temperature of up to about 120° C.

4. A method as in claim 1 wherein said curing step is conducted at a temperature of at least about 220° C. and said annealing step is conducted at a temperature between about 60° C. and 90° C.

5. A method as in claim 1 wherein in said curing step the coercivity of said composition is raised to about the maximum value possible by curing said coating composition in an anaerobic atmosphere 6. A method as in claim 1 wherein the annealing step is conducted in air.

7. A method as in claim 1 wherein the curable binder is an epoxy/phenolic resin, the magnetic particles are $\gamma$-Fe$_2$O$_3$ particles, the curing is conducted for about 2 hours at a temperature of at least about 220° C., and the annealing step is conducted at a temperature of about 60° C. to about 90° C.

8. A method as in claim 1 wherein the curable binder is an epoxy/phenolic resin, the magnetic particles are cobalt-adsorbed $\gamma$-Fe$_2$O$_3$ particles, the curing step is conducted for about 2 hours at a temperature of at least about 220° C., and the annealing step is conducted at a temperature of about 60° C. to about 90° C.

9. A method as in claim 1 wherein the curable binder is a polyurethane resin, the magnetic particles are cobalt-adsorbed $\gamma$-Fe$_2$O$_3$ particles, the curing step is conducted for about 2 hours at a temperature of at least about 200° C., and the annealing step is conducted at a temperature of about 60° C. to 90° C.

10. A magnetic recording disk comprising a film of a cured magnetic coating composition produced according to the process of claim 1.

11. A recording disk as in claim 10 wherein said coating composition is $\gamma$-Fe$_2$O$_3$ particles dispersed in a cured epoxy/phenolic binder.

12. A recording disk as in claim 10 wherein said coating composition is cobalt adsorbed-$\gamma$-Fe$_2$O$_3$ particles dispersed in a cured epoxy/phenolic binder.

13. A recording disk as in claim 10 wherein said coating composition is cobalt-adsorbed-$\gamma$-Fe$_2$O$_3$ particles in a cured polyurethane resin.

14. A recording disk as in claim 10 comprising two magnetic recording layers, a first layer comprising a buried servo layer of enhanced stable coercivity, and a second layer of lower stable coercivity.

* * * * *